UNITED STATES PATENT OFFICE.

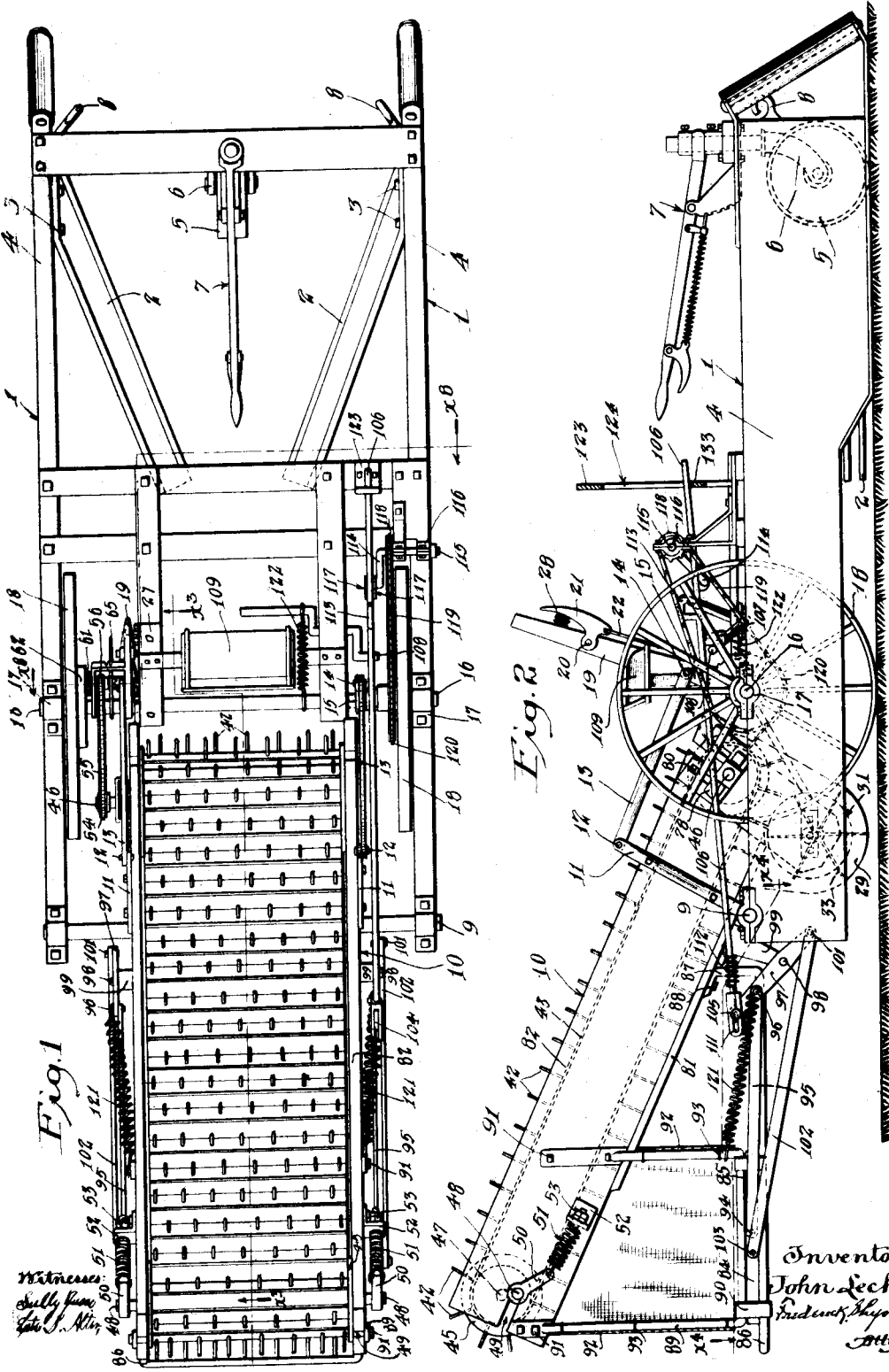

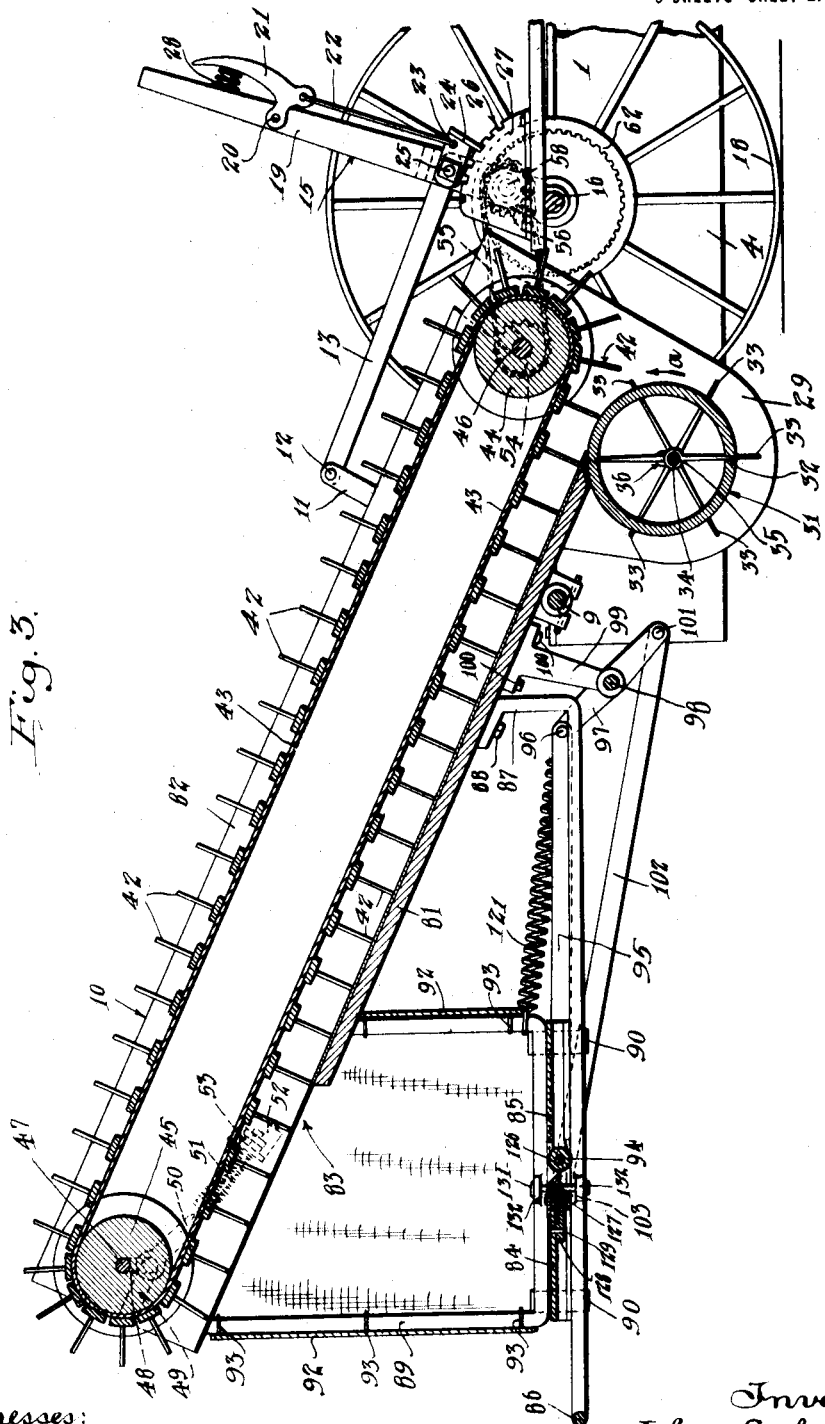

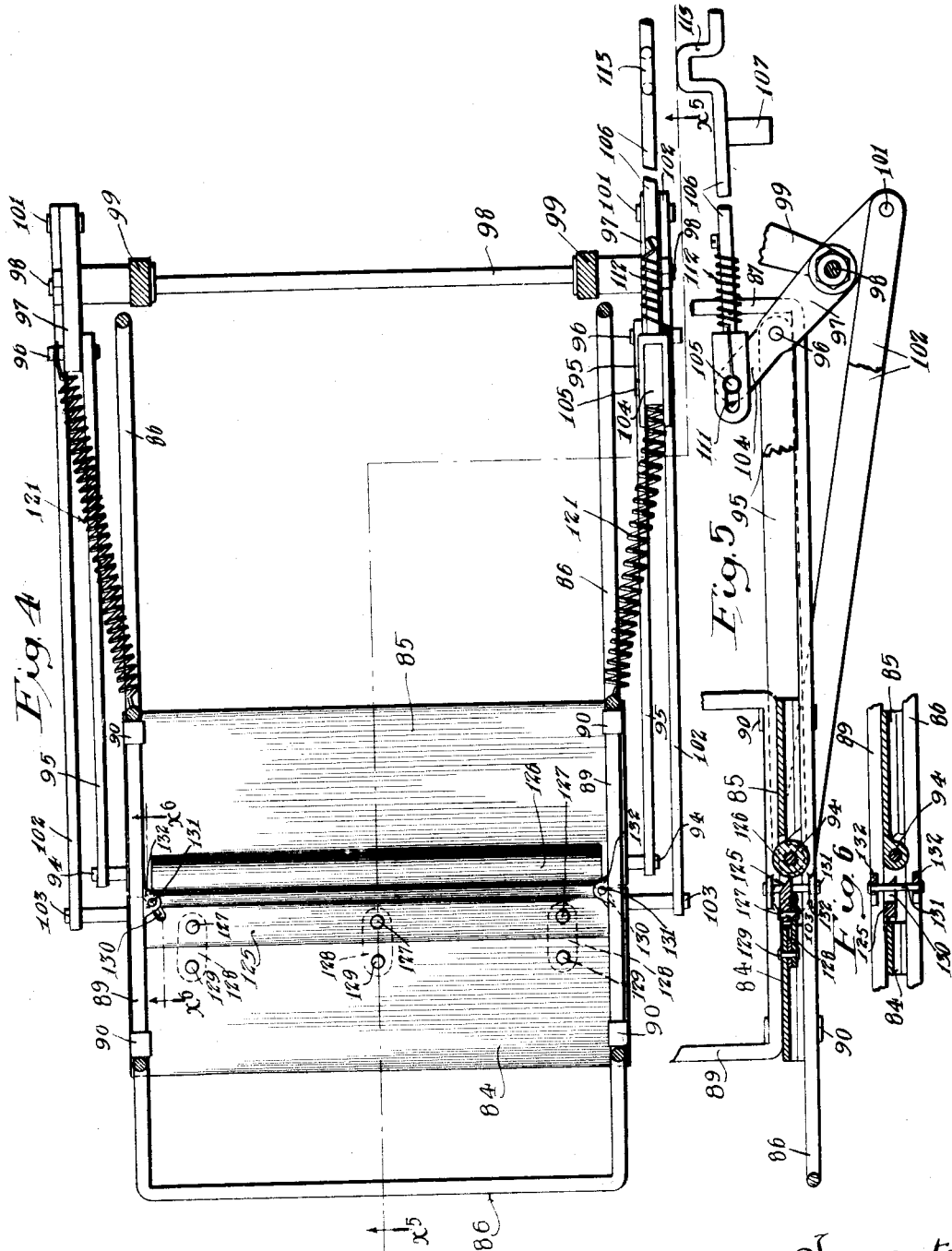

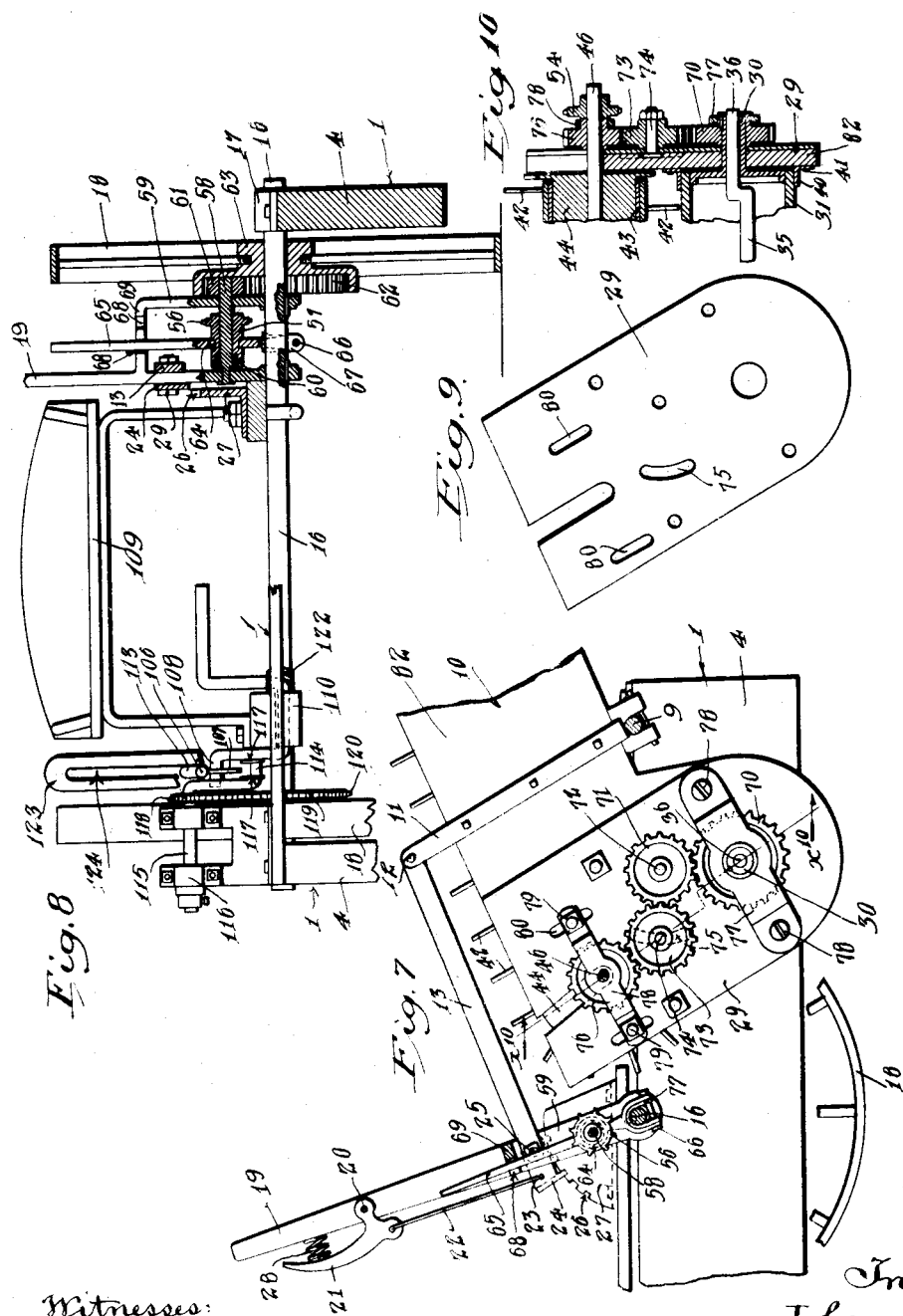

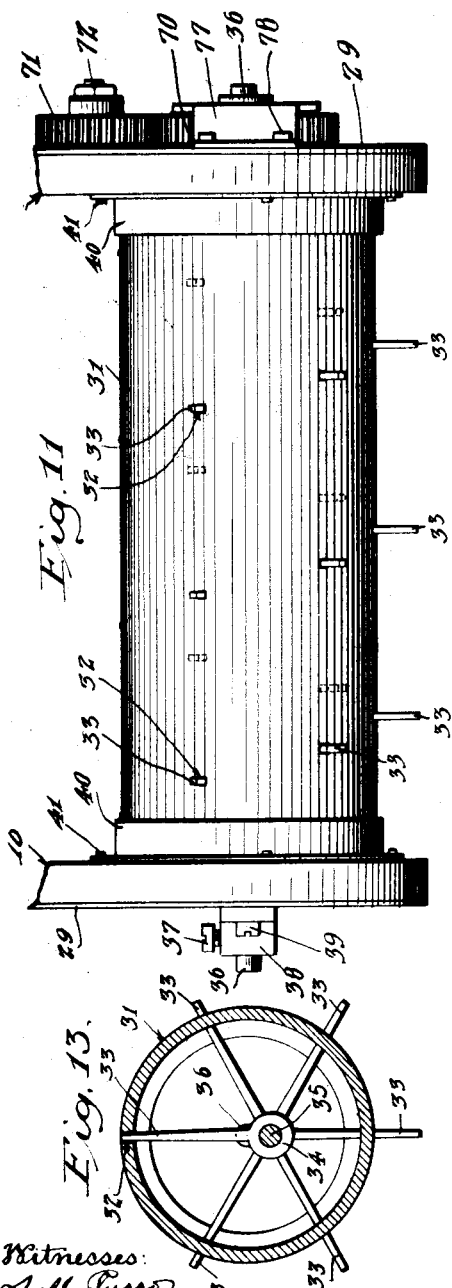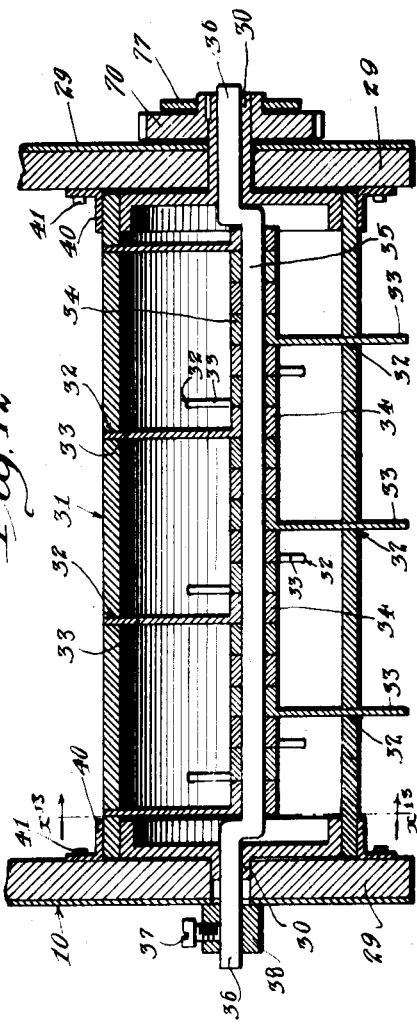

JOHN LECK, OF SANTA ANA, CALIFORNIA.

HARVESTER FOR BEANS AND THE LIKE.

1,345,936.  Specification of Letters Patent.  Patented July 6, 1920.

Application filed January 23, 1919. Serial No. 272,617.

*To all whom it may concern:*

Be it known that I, JOHN LECK, a citizen of the United States, residing at Santa Ana, in the county of Orange and State of California, have invented a new and useful Harvester for Beans and the like, of which the following is a specification.

This invention relates to machines or apparatus of the character employed in gathering and shocking beans and the like, and an object of the invention is to make provision for performing these different operations on the beans with a minimum of shaking action on the bean vines so as to avoid shaking out the beans from the pods and thus losing them.

Another object is to provide novel means for picking up the bean or other vines from the field after they have been cut from the stalks.

Another object is to make provisions for gathering the vines in shocks or piles and depositing said shocks at spaced intervals on the field.

Another object is to make provisions for severing the vines during the operation of depositing the shock on the field, so as to prevent the dragging of the vines over the field.

Another object is to provide a novel form of shock-dumping mechanism.

Another object is to so construct the harvester as to cause the same to be substantially balanced on the two ground wheels thereof so that the sled runners or frame of the cutting device will be prevented from digging into the ground.

Other objects and advantages will appear in the subjoined detailed description.

The accompanying drawings illustrate the invention:

Figure 1 is a plan view of a harvester constructed in accordance with the provisions of this invention.

Fig. 2 is a side elevation of Fig. 1, the hopper being shown in section.

Fig. 3 is an enlarged fragmentary longitudinal section on line indicated by $x^3$—$x^3$, Fig. 1.

Fig. 4 is a plan view partly, in section, from line indicated by $x^4$—$x^4$, Fig. 2, portions of the operating rod of the shock-dumping mechanism being broken away to contract the view.

Fig. 5 is a sectional elevation on line indicated by $x^5$—$x^5$, Fig. 4.

Fig. 6 is a fragmental sectional elevation on line indicated by $x^6$—$x^6$, Fig. 4.

Fig. 7 is an enlarged elevation of the middle portion of the harvester viewed from the side opposite to that shown in Fig. 2.

Fig. 8 is a transverse sectional elevation mainly from the irregular line indicated by $x^8$—$x^8$, Fig. 1.

Fig. 9 is a side view of the bearing plate in Fig. 7.

Fig. 10 is a fragmental sectional elevation on the irregular line indicated by $x^{10}$—$x^{10}$, Fig. 7.

Fig. 11 is an enlarged elevation of the drum and its parts and mounting.

Fig. 12 is a longitudinal sectional elevation of Fig. 11.

Fig. 13 is a transverse section of the drum on line indicated by $x^{13}$—$x^{13}$, Fig. 12, the teeth also being shown.

There is provided a traveling sled or frame 1 carrying rearwardly and inwardly slanting knives 2 for severing the bean vines from their stalks. The frame 1 and knives 2 substantially correspond to those at present employed in the cutting of beans and the sled and knives therefor constitute a bean cutter. This bean cutter may be otherwise constructed if desired. In this instance the knives 2 are bolted or otherwise fastened at 3 at their forward ends to the inner faces of the runners 4 of the sled. The forward end of the sled may be provided with a caster wheel 5 journaled in a fork 6 which may be raised and lowered by suitable mechanism indicated in general by the character 7. This raising and lowering mechanism 7 need not be described in detail herein since it constitutes no part of this present invention. The forward ends of the runners 4 are provided with hitch hooks 8 for connecting the harvester to the operating power.

At its rear end the sled 1 is pivoted by a transversely extending rod 9 to an elevator or conveyer casing 10 which is constructed in the form of a trough. The casing 10 projects rearwardly of the sled 1 and also projects forwardly of the pivot 9 between the sled runners 4. Means are provided to swing the casing 10 on its pivot 9 to different angles relative to the frame 1 so as to raise or lower the forward end of the casing. This may be accomplished by any suitable means and in the drawings the construction shown is as follows: The sides of the casing 10 are provided with arms 11 which project above the top of the casing and said arms are pivoted at their upper ends at 12 to the rear ends of links 13 that in turn are pivoted at their forward ends at 14 to arms 15 fixed to an axle 16. The axle 16 is journaled at 17 to the runners of the sled and fixed to the axle between the runners 4 are ground wheels 18 adapted to engage the surface of the field in which the harvester is operating. One of the arms 15 is provided with an extension 19 forming an operating handle and to said handle is pivoted at 20 a lever 21 which is pivoted to a rod 22 that in turn is pivoted at 23 to a detent 24. The detent 24 is pivoted at 25 to the arm 19 and is adapted to selectively engage notches 26 in a quadrant 27 which is mounted on the sled 1. The detent 24 is normally held in engagement with any one of the notches 26 by reason of there being a spring 28 between the handle 19 and lever 21 tending to hold the lever 21 in such position as to hold the rod 22 downward. The value of thus being able to adjust the elevation of the front end of the casing 10 relative to the surface of the field will appear hereinafter.

The forward end of the casing sides are provided with downwardly projecting plates 29 in which are journaled the tubular shafts 30 of a drum 31. The peripheral face of the drum is substantially flush with the inside face of the bottom of the casing 10. The drum 31 is provided with perforations 32 in its periphery and extending into said perforations are teeth 33 which project from collars 34 mounted on the crank 35 of a crank shaft 36. The ends of the crank shaft 36 extend through the tubular shafts 30 of the drum and said crank shaft is held stationary by any suitable means, the drum revolving therearound. In the drawings the crank shaft is held stationary by a set screw 37 engaging the crank shaft and mounted in a bearing 38 which is fastened to the outer face of the adjacent plate 29 by lag screws 39 or the like. The bearing 38 is tubular and the crank shaft 36 projects thereinto so that the set screw can be tightened against the crank shaft.

At the ends of the drum 31 are positioned annular guards 40 which are L-shaped in cross section and which are fastened by screws 41 or the like to the inner faces of the side walls of the casing 10. The annular guards 40 project over the end portions of the drum so as to prevent the vines being harvested from catching between the ends of the drum and the side walls of the casing 10. It is clear that if the drum 31 be rotated the teeth 33, rotating with the drum, will be caused to move in and out relative to the surface of the drum. The crank 35 projects downwardly and the teeth 33 are of such lengths that their outer ends do not project beyond the peripheral face of the drum when the outer ends of the teeth are at the upper portion of the drum. The axis of the crank 35 being eccentric to the axis of the drum, it is clear that when the outer ends of the teeth 33 are at the lower portion of the drum they will project from the face thereof. Thus as the drum rotates the teeth 33 will move in and out relative to the face thereof. Preferably the perforations 32 and teeth 33 will be arranged in several spiral series around the periphery of the drum.

The drum 31 is adapted to rotate in the direction indicated by the arrow $a$, Fig. 3, and the teeth 33 are adapted to pick up the vines from the field and raise them toward the lower and forward end of the casing 10 and into the path of travel of conveyer fingers 42 projecting from an endless belt 43 which is rove around pulleys or rollers 44, 45 mounted on shafts 46, 47 respectively. When the roller 44, which is tight on the shaft 46, is turned it causes the belt to travel so as to move the fingers 42 on the lower run of the belt upward and rearward along the bottom of the casing 10. The shaft 47 is provided with a crank 48 on which the roller 45 is loosely mounted and the end portions of the crank shaft 47 are journaled in slots 49 in the rear ends of the side members of the casing 10. Each end portion of the shaft 47 outside of the casing 10 is provided with an arm 50 to which is attached a coil spring 51 and said spring is in turn connected by an ear 52 and nuts 53 to the outer face of the adjacent side of the casing 10. The crank 48 and arm 50 are so positioned that the pull of the spring 51 tends to force the crank 48 and its roller 45 rearward so as to keep the belt 43 taut. Thus the crank shaft 47, arms 50 and spring 51 together constitute a particular form of belt tightener. Other forms of belt tighteners may be used in the combination in place of the one described.

The shaft 46 is provided with a sprocket wheel 54 operated by a sprocket chain 55 which is rove around a sprocket wheel 56. The sprocket wheel 56 is formed integral with a clutch member 57 which is shiftably mounted on a shaft 58 journaled in standards 59 mounted on the sled 1. The clutch member 57 is adapted to be moved into and out of engagement with a clutch member 60 fixed to the shaft 58 and rotated thereby. The shaft 58 is provided at its outer end with a pinion 61 meshing with an internal gear 62 formed on the hub 63 of one of the ground wheels 18 which thus causes the belt 43 to be driven when the harvester travels over the field. The clutch member 57 is provided with an annular groove 64 engaged by a lever 65 which is pivoted at 66 to a bracket 67 mounted on the sled 1. The lever 65 is adapted to selectively engage notches 68 in a cross bar 69 which connect the upper ends of the standards 59 to one another. When the clutch members are engaged the shifting lever 65 is in one of the notches and when said members are disengaged the lever is in the other notch. By the means just described the conveyer belt may be operated or not as desired.

In order that the drum 31 may be driven one of the drum shafts 30 is provided with a spur gear 70 meshing with a spur gear 71 mounted on a stub shaft 72 which projects from the outer face of the plate 29. The spur gear 71 meshes with a spur gear idler 73 that is journaled on a stub shaft in the form of a bolt 74, the head end of the bolt engaging a curved slot 75 in the plate and the curvature of the slot conforming to an arc of which the center is located at the axis of the shaft 72 so that the idler gear 73 can be adjusted peripherally of the gear 71. The idler gear 73 meshes with a spur gear 76 which is fixed to the shaft 46 of the roller 44. The shaft 46 when being driven as hereinbefore described, causes driving of the train of gears 70, 71, 73 and 76 so as to rotate the drum 31. Whether or not the drum rotates depends upon whether or not the clutch members 57, 60 are engaged or not. The hub of the gear 70 projects through a strap 77 fastened by screws 78 or the like to the outer face of the plate 29. The hub of the gear 76 projects through a strap 78 fastened at its ends by bolts 79 which are accommodated in slots 80, said slots extending longitudinally of the plate 29 so that the strap 78 may be adjusted up or down. Such adjustment up or down of the strap 78 of course adjusts the shaft 46 and consequently the roller 44, and by such adjusting means the forward end of the belt 43 may be adjusted toward and from the bottom of the casing 10 so as to regulate the distance between the fingers 42 and casing bottom. When the shaft 46 is adjusted up or down and with it the gear 76, the idler gear 73 may be appropriately adjusted also because of the curved slot 75 hereinbefore described.

When the bean or other vines have been picked up by the teeth 33 and have been elevated into the path of travel of the fingers 42, it is clear that the vines will be raked from the drum and teeth by the fingers and impelled along the bottom 81 of the casing 10. The bottom 81 is substantially tangential to the periphery of the drum 31. The rear end of the bottom 81 of the casing terminates short of the rear ends of the sides 82 of the casing so as to provide an opening 83 through which the vines will discharge from the casing. When the vines thus discharge through the opening 83 they fall upon a sectional platform or table comprising relatively movable sections 84, 85. The sections 84, 85 slide upon and are supported by a bracket of any suitable construction. In the instance shown in the drawings the bracket comprises a substantially horizontal U-shaped member 86 connected by upwardly bent end portions 87 and bolts 88 to the casing bottom 81. The bracket also comprises a pair of oppositely arranged U-shaped members 89 fastened by straps 90 to the horizontal bracket member 86 and fastened at their upper ends by bolts or screws 91 to the outer faces of the casing sides 82. The bracket and table are so arranged that normally the table sections 84, 85 extend beneath the opening 83 in the casing 10.

In the instance shown in the drawings the table sections 84, 85 constitute the bottom of a hopper of which the walls 92 are formed by any suitable material as, for instance, canvas or the like. The hopper walls 92 may be conveniently fastened in place to the U-shaped members 89 by clips 93 or other suitable fastening means. When the table sections 84, 85 are normally closed together as in Fig. 3 the bean vines discharging into the hopper will collect therein to form a shock and means are provided to discharge said shock and such means will now be described. Pivoted at their rear ends at 94 to the side edges of the table section 85 are shifting rods 95 which are pivoted at their forward ends at 96 to one end of levers 97 respectively, said levers being fixed to an operating shaft 98 supported in bearings 99 that are fastened by bolts 100 to the casing bottom 81. The other end of the levers 98 are pivoted at 101 to the forward ends of shifting rods 102 which are pivoted at their rear ends at 103 to the side edges of the table sections 84.

One of the levers 97 is provided with an operating arm or extension 104 which is connected by a pivot 105 to one end of a rod 106 that is provided with a downwardly projecting lug forming an abutment 107. The rear face of the abutment 107 is in the path of travel of a lever 108 which may be operated by the foot of the driver of the harvester from the seat 109 that is mounted on the sled 1. The lever 108 is journaled in a bearing 110 mounted on the sled 1. The lever is of U-shape construction and forms a bell crank and when said lever is pushed forward it engages the abutment 107 so as to move the rod 106 forward to a certain degree. This movement of the rod 106 does not affect the levers 97 for the reason that the rod 106 is provided with a slot 111 in which the pivot 105 slides so that lost motion may occur between the rod 106 and lever 97. Normally the pivot 105 is held in the forward end of the slot 111 by a spring 112 fastened at one end to said pivot and fastened at its other end to the rod 106 as clearly shown in Fig. 5. When the rod 106 is moved forward by pressure on the abutment 107 as just described, such movement occurs against the pull of the spring 112 and, when such movement occurs, a hook 113 formed on the forward end of the rod 106 is caused to move into the path of travel of an abutment 114 projecting from the inner face of a crank shaft 115 journaled in bearings 116 on the sled, said abutment 114 being in the form of a stud and there being shoulders 117 on the stud between which the rod 106 is adapted to ride. These shoulders 117 aid in guiding the rod 106 but are not absolutely essential to the invention and may be omitted if desired. The crank shaft 115 is provided with a sprocket wheel 118 which is driven by a sprocket chain 119 rove around a sprocket wheel 120 fixed on the axle 16. It is now clear that when the rod 106 has been moved forwardly by operation of the crank 108 the crank shaft 115 will engage the hook 113 and cause the rod 106 to be pulled forwardly, thus causing the rods 95 to be pulled forwardly and the rods 102 to be pushed rearwardly, the result being that the table section 85 is shifted forwardly and the table section 84 rearwardly so as to separate said sections from one another and allow the bean vines deposited on said table to fall through the opening between the sections to the ground.

Resilient means are provided to yieldingly hold the table sections 84, 85 against separation from one another and to move the sections toward one another after they have been separated and these means are formed by coil springs 121 which are fastened at their rear ends to the bracket members 89 and at their forward ends to the pivots 96.

To retract the foot operated lever 108 a coil spring 122 is fastened at its forward end to the lever 108 and at its rear end to the axle 16 or other suitable relatively stationary member. The forward end of the rod 106 is provided with a guide in the form of a standard 123 that is provided with a vertical slot 124 in which the rod 106 can freely move up and down when engaged by the crank shaft 115. The standard 123 is mounted on the sled 1. It may here be noted, when the hook 113 is not engaged with the crank shaft 115, said crank shaft will merely engage the rod 106 at a point forward of said hook so as to cause the forward end of the rod 106 to reciprocate vertically without pulling said rod endwise, the endwise movement resulting only when the hook 113 is engaged by the crank shaft 115.

Means are provided to sever the vines forming a shock from the following vines discharging from the casing 10 through the opening 83 and such means operate after the shock has been discharged from the table sections 84, 85. These means may be variously constructed as regards the broader aspects of the invention, and in the drawings the coöperating table sections perform the severing operation and such means are constructed as follows: The forward or meeting edge of the section 84 is formed by a knife 125 adapted to engage the rear edge of the section 85 when the sections are moved toward one another. In the instance shown in the drawings the rear or meeting edge of the section 85, for this purpose, is formed by a roller 126 rotative on the pivot 94. This roller may be made of any suitable material that will not tend to dull the knife, for instance, of wood or fiber. It is clear that as the bean vines are pushed off of the section 85 by forward movement of said section said vines will roll over the roller 126 and thus turn said roller so that during the operation of the harvester the roller will be worn uniformly around its periphery by the action of the knife 125 thereagainst and said knife will not therefore produce ridges in the roller. The knife 125 may be mounted on either one of the table sections 84, 85 and, although the knife may be stationarily mounted, it is preferably so mounted as to be subjected to endwise movement, the reason for this particular mounting of the knife 125 being that bean or other like vines are very wiry and tough and are therefore very difficult to cut unless a drawing or endwise movement be given the knife during the cutting operation. The knife 125 is pivoted at 127 to links 128 which in turn are pivoted at 129 to the table section 84. It is thus clear that the knife 125 can be moved endwise and such endwise movement may be produced by any suitable means. In this instance the endwise movement is caused by reason of there being near the ends of the knife 125 slots 130 extending diagonally to the longitudinal axis of the plate and opening through the forward edge of the knife. Said slots 130 are adapted to be engaged by pins 131 which are each fastened at their ends in ears 132 projecting inward from the sides of the U-shaped bracket members 86, 89 respectively. Thus the pins 131 are held stationary and when the table section 84 is moved by the springs 121 toward the table section 85 the pins 131 will be engaged by the rear walls of the slots 130 to move the knife 125 edgewise as is clearly understood, the pins 131 and slots 130 forming a cam device to cause the endwise movement of the knife. In the instance shown the pivots 103 project from the ends of the knife 125.

It is understood that the knives 2 may be omitted from the harvester, if desired, and the cutting of the bean vines from their stalks be effected by a bean cutter independent of the harvester. Thus it is clear that the knives 2 form no part of this present invention, though when provided they coöperate therewith so that by the use of the harvester the vines will be cut from the stalks and then gathered into shocks and deposited at intervals on the field, thus performing the various operations with one machine.

It is preferred that the parts of the harvester positioned rearward of the axle 16 substantially counterbalance the parts in front of said axle, when the driver is on the seat 109; the parts in front of the axle being just enough heavier than the parts rearward thereof to maintain the sides of the sled in contact with the surface of the field on which the harvester is operating.

The construction and operation will be clear from the foregoing but the operation may be briefly described as follows: The harvester will be connected by the draft hooks 8 to suitable draft power and the harvester will be drawn over the field astride of two rows of bean vines. The knives 2 will sever the bean vines from their stalks, one knife operating on each row. The vines thus cut will be picked up by the teeth 33 of the rotating drum 31 and raised by said drum to within the path of travel of the conveyer fingers 42 which will thereupon rake the vines upward and rearward from the drum along the casing bottom 81 to the opening 83. The vines after reaching the opening 83 fall downward into the hopper upon the table 84, 85. When, according to the judgment of the operator, sufficient vines have been deposited in the hopper 92 to form a shock, the driver will press forward on the lever 108 so as to cause the hook 113 to be moved into the path of travel of the crank shaft 115 which thereupon causes the rod 106 to be moved quickly forward so as to move the table sections 84, 85 away from one another to open position, thus permitting the shock of bean vines to fall from the hopper upon the field substantially in alinement with the rows of vines being operated on. The bottom of the slot 124 of the standard 123 forms a stop or abutment 133 upon which the rod 106 strikes after the crank shaft 115 has pulled the rod 106 forward sufficiently to open the table 84, 85. When the rod 106 strikes the abutment crank shaft 115 continues to descend, thus withdrawing the hook 113 from engagement with the crank shaft. This of course releases the rod 106 and permits the pull of the spring 121 to quickly return the table sections 84, 85 toward one another so as to close the table. The action set up by the springs 121 is quick so that the sections 84, 85 close together with a snap. When the section 84 moves into closing position the pins 131 are engaged by the slots 130 thus causing the knife 125 to shift endwise as before explained. This endwise movement of the knife 125 together with the blow of the knife on the vines caused by the pull of the springs 121 severs the vines which form the shock from the following vines being fed into the hopper 92 from the casing 10. The driver will have removed his foot from the lever 108 as soon as the forward movement of the rod 106 has been effected and thereupon the spring 122 will retract the lever 108 so that when the rod 106 has returned to table-closing position the rod will remain in that position while another shock of vines is being formed in the hopper 92.

Thus the operation of the hopper will continue, the operator causing the table to open at intervals to deposit the shocks at intervals along the path of travel of the harvester.

Some rows of bean vines are thicker than others and it is for this reason that the drum 31 can be adjusted toward and from the surface of the field. If the machine is operating along thicker rows of bean vines, the operator will move the handle 19 rearwardly thus causing the forward end of the casing 10 to swing upwardly, thus carrying the drum 31 with it to increase the space between the drum and surface of the field. If the row of bean vines is thinner the operator will move the handle 19 forwardly so as to depress the forward end of the casing 10 thus carrying the drum 31 toward the surface of the field to reduce the space between the drum and surface of the field.

The size of the various gears and sprocket wheels above described will be such as to preferably drive the belt 43 at substantially the same surface speed as the speed of travel of the harvester over the ground so that, if the table sections 84, 85 were in open position, the bean vines picked up by the teeth 33 would merely be raised substantially vertically and then deposited on the field substantially in the location from which the vines were raised, the passage of the vines through the harvester being substantially at the same rate of speed as that of the harvester over the ground. Of course the table sections 84, 85 are interposed between the vines and the field at certain intervals so as to interrupt the flow of vines from the harvester to the ground to form the shocks which are discharged one at a time from the harvester. Thus it is clear that the bean vines will not be unduly shaken and pulled during the harvesting operation and consequently the loss from shaking of the beans from the vines will be a minimum. This is very important for, by the methods employed at present in harvesting beans, a relatively large percentage of the beans is shaken from the vines and is therefore substantially lost to the grower.

It is noted that the particular construction of the means above described for picking up the vines from the field is of advantage for the reason that any clods which may be picked up by the teeth 33 will be released by the teeth before the clods reach the casing 10.

I claim:

1. A harvester for beans and the like comprising traveling means to pick up the vines from the field, means to receive the vines from the pick up means and to discharge said vines onto the field in shocks, and means to sever the vines in the shock from the following vines after discharge of the shock of vines from the harvester.

2. A harvester for beans and the like comprising a table formed in sections, means to slide one of the sections toward and from the other section, traveling means to pick up the vines from the field and discharge them onto the table, and means operating during the sliding movement of the first section toward the other section to sever the vines.

3. A harvester for beans and the like comprising a table formed in sections, means to move one of the sections toward and from the other section, traveling means to pick up the vines from the field and discharge them onto the table, and means to sever the vines.

4. A harvester for beans and the like comprising a table formed in sections, means to move one of the sections toward and from the other section, and traveling means to pick up the vines from the field and discharge them onto the table, said sections coöperating to sever the vines.

5. A harvester for beans and the like comprising a table formed in sections, means to move one of the sections toward and from the other section, and traveling means to pick up the vines from the field and discharge them onto the table, the meeting edge of one of the sections being formed by a knife.

6. A harvester for beans and the like comprising a table formed in sections, means to move one of the sections toward and from the other section, and traveling means to pick up the vines from the field and discharge them onto the table, the meeting edges of the sections being respectively formed by a knife and roller.

7. A harvester for beans and the like comprising a table formed in sections, means to move the sections toward and from one another, said sections coöperating when closing to sever the vines, and traveling means to pick up the vines from the field and discharge them onto the table.

8. A harvester for beans and the like comprising a table formed in sections, means to slide the sections toward and from one another, traveling means to pick up the vines from the field and discharge them onto the table, and means operating during sliding of the sections toward one another to sever the vines.

9. A harvester for beans and the like comprising a table formed in sections, means operative to slide one of the sections away from the other section and to then release the first named section, means to force the first section toward the second section when the first section is released, traveling means to pick up the vines from the field and discharge them onto the table, and means operating during sliding of the one section toward the other section to sever the vines.

10. A harvester for beans and the like comprising a table formed in sections, means operative to move one of the sections away from the other section and to then release the first named section, said sections coöperating to sever the vines, means to force the first section toward the second section when the first section is released, and traveling means to pick up the vines from the field and discharge them onto the table.

11. A harvester for beans and the like comprising a table formed in sections, means operative to move one of the sections away from the other section and to then release the first named section, the meeting edge of one of the sections being formed by a knife, means to force the first section toward the second section when the first section is released, and traveling means to pick up the vines from the field and discharge them onto the table.

12. A harvester for beans and the like comprising a table formed in sections, means operative to slide the sections away from one another and to then release said sections, means to force the sections toward one another when released, traveling means to pick up the vines from the field and discharge them onto the table, and means operating when the sections are released to sever the vines.

13. A harvester for beans and the like comprising a table formed in sections, means operative to move the sections away from one another and to then release said sections, means to force the sections toward one another when released, said sections coöperating when closing to sever the vines, and traveling means to pick up the vines from the field and discharge them onto the table.

14. A harvester for beans and the like comprising a table formed in sections, means operative to move the sections away from one another and to then release said sections, the meeting edge of one of the sections being formed by a knife, means to force the sections toward one another when released, and traveling means to pick up the vines from the field and discharge them onto the table.

15. A harvester for beans and the like comprising a table formed of sections, means to move one of the sections toward and from the other section, the meeting edge of one of the sections being formed by a knife, said knife being mounted to shift endwise, means to cause endwise shifting of the knife, and traveling means to pick up the vines from the field and discharge them onto the table.

16. A harvester for beans and the like comprising a table formed of sections, means to move one of the sections toward and from the other section, the meeting edge of the first named section being formed by a knife, said knife being mounted to shift endwise, means operative by the movement of the first named section to cause endwise shifting of the knife, and traveling means to pick up the vines from the field and discharge them onto the table.

17. A harvester for beans and the like comprising a table formed of sections, means to move one of the sections away from the other section and to then release said other section, the meeting edge of the first named section being formed by a knife, said knife being mounted to shift endwise, means to return the first named section toward the second section when released, means operative by the return movement of the first section to cause endwise shifting of the knife, and traveling means to pick up the vines from the field and discharge them onto the table.

18. A harvester for beans and the like comprising a traveling rotary drum, teeth at the periphery of the drum to pick up vines as the drum rotates, means to rake the vines from the drum, and means to cut the vines.

19. A harvester for beans and the like comprising a traveling rotary drum, teeth adapted to project from the periphery of the drum, means to move the teeth in and out while the drum rotates, means to rake the vines away from the drum, and means to cut the vines.

20. A harvester for beans and the like comprising a traveling rotary drum, teeth adapted to project from the periphery of the drum, means operative by rotation of the drum to move the teeth in and out, means to rake the vines away from the drum, and means to cut the vines.

21. A harvester for beans and the like comprising a traveling rotary drum, teeth adapted to project from the periphery of the drum, a casing having one end disposed adjacent the upper portion of the periphery of the drum, an endless belt traveling in the casing and having one end above and spaced from the drum and having fingers to rake the vines from the drum onto the bottom of the casing, the bottom of the casing being substantially tangential to the periphery of the drum, and means to move the teeth out at the lower portions of the drum and to move said teeth in at the upper portions of the drum.

22. A harvester for beans and the like comprising a traveling frame, a casing pivoted intermediate of its ends to the frame, a rotary drum mounted on one end of the casing, teeth on the drum to pick up vines from the field, means in the casing to move the vines from the drum through the casing, and means to hold the casing at different angles relative to the frame.

23. A harvester for beans and the like comprising a rotary drum, teeth on the drum to pick up vines from the field, a traveling frame, a casing movably mounted on the frame and having its forward end disposed near the drum, means in the casing to move the vines from the drum through the casing, and means to move the drum and forward end of the casing together toward and from the surface of the field.

24. A harvester for beans and the like comprising means to pick up vines from the field, a traveling frame, a casing movably mounted on the frame and having its forward end disposed near the pick up means, means in the casing to move the vines from the pick up means through the casing, and means to move the pick up means and forward end of the casing together toward and from the surface of the field.

25. A harvester for beans and the like comprising a table formed of relatively movable sections, means to pick up the vines from the field and discharge them upon the table, a crank, means to turn the crank, a rod having a hook, means operatively connecting the rod to the sections to move them, means to move the rod endwise into different positions to cause the hook to move into and out of the path of travel of the crank, and an abutment to limit the downward movement of the rod when the hook is engaged by the crank so as to disengage the hook from the crank.

26. A harvester for beans and the like comprising a table formed of relatively movable sections, means to pick up the vines from the field and discharge them upon the table, a rotating member, a member having a hook, means operatively connecting the last named member with the sections to move said sections, means to move the member having the hook into different positions to cause the hook to move into and out of the path of travel of the crank, and means to limit the downward movement of the member having the hook when said hook is engaged by the rotating member so as to disengage the hook from said rotating member.

27. A harvester for beans and the like comprising a sled, knives on the forward portion of the sled to cut the vines from their stalks, an axle mounted on the rear portion of the sled, ground wheels on the axle, and means mounted on the sled rearward of the axle and operated by turning of the ground wheels to pick up the vines from the field and discharge them in shocks upon the field.

28. A harvester for beans and the like comprising a frame, an axle on the frame, ground wheels on the axle, means connected with the ground wheels and operative by turning of the ground wheels to pick up the vines from the field, means to receive the vines from the pick-up means and to discharge said vines on to the field in shocks, and means to sever the vines in the shock from the following vines after discharge of the shock of vines from the harvester.

Signed at Los Angeles, California, this 15th day of January, 1919.

JOHN LECK.

Witnesses:
  GEORGE H. HILES,
  L. BELLE WEAVER.